US006684680B2

(12) United States Patent
Pierskalla et al.

(10) Patent No.: US 6,684,680 B2
(45) Date of Patent: Feb. 3, 2004

(54) CARTRIDGE FOR PACKAGING A SENSOR IN A FLUID CALIBRANT

(75) Inventors: Irvin T. Pierskalla, Prior Lake, MN (US); Kent R. Winger, Prior Lake, MN (US); Brandon W. Reynolds, Prior Lake, MN (US); Victor E. Kimball, Burnsville, MN (US)

(73) Assignee: Optical Sensors, Inc., Eden Prairie, MN (US)

(*) Notice: Subject to any disclaimer, the term of this patent is extended or adjusted under 35 U.S.C. 154(b) by 59 days.

(21) Appl. No.: 10/162,048

(22) Filed: Jun. 3, 2002

(65) Prior Publication Data

US 2003/0221477 A1 Dec. 4, 2003

(51) Int. Cl.[7] .................................... G01N 21/00
(52) U.S. Cl. ............................................ 73/1.03
(58) Field of Search ........................ 73/1.03; 436/11; 358/42; 600/310, 311, 322, 323, 331

(56) References Cited

U.S. PATENT DOCUMENTS 3,380,929 A 4/1968 Petersen
3,681,255 A 8/1972 Wilfore et al.
3,892,058 A 7/1975 Komatsu et al.
3,905,889 A 9/1975 Macur et al.
4,016,863 A 4/1977 Brantigan
4,116,336 A 9/1978 Sorensen et al.
4,289,648 A * 9/1981 Hoskins et al. ............... 436/11
4,375,743 A * 3/1983 Sullivan ...................... 53/434
4,632,119 A 12/1986 Reichstein
4,643,192 A 2/1987 Fiddian-Green
4,774,656 A * 9/1988 Quatse et al. .................. 714/4
4,830,013 A 5/1989 Maxwell
4,981,470 A 1/1991 Bombeck, IV
5,004,583 A * 4/1991 Guruswamy et al. ......... 422/58
5,105,812 A 4/1992 Corman
5,111,817 A 5/1992 Clark et al.
5,117,827 A 6/1992 Stuebe et al.
5,174,290 A 12/1992 Fiddian-Green
5,230,427 A * 7/1993 Betts et al. .............. 206/213.1
5,328,848 A * 7/1994 Fong et al. ................... 436/11
5,341,803 A 8/1994 Goldberg et al.
5,372,136 A 12/1994 Steuer et al.
5,411,022 A 5/1995 McCue et al.
5,423,320 A 6/1995 Salzman et al.
5,456,251 A 10/1995 Fiddian-Green
5,480,611 A 1/1996 Mills et al.

(List continued on next page.)

OTHER PUBLICATIONS

Vurek et al., "A Fiber Optic $PCO_2$ Sensor," *Annals of Biomedical Engineering, 2,* 499–510 (1983).

*Primary Examiner*—Hezron Williams
*Assistant Examiner*—Charles D Garber
(74) *Attorney, Agent, or Firm*—Barbara A. Wrigley; Oppenheimer, Wolff & Donnelly

(57) ABSTRACT

The invention relates to a cartridge for packaging an analyte-containing fluid calibrant. The cartridge is formed from a container having an opening sealed by a sealing member. A septum divides the container into a calibrant compartment and an outer compartment. A probe is provided comprising an analyte-detecting portion and a connecting portion that allows for operative connection to a device for quantitating or determining the concentration of the analyte. The probe may extend sealingly through the septum such that the analyte-detecting portion is located in the calibrant compartment and the connecting portion is located in the outer compartment. The construction of the cartridge provides ease and reduces the likelihood of error in calibrating the probe. The invention also relates to a method of manufacturing the cartridge and a method for calibrating a device for analyte concentration determination and quantitation using the inventive cartridge.

64 Claims, 6 Drawing Sheets

U.S. PATENT DOCUMENTS

| | | | | | |
|---|---|---|---|---|---|
| 5,579,763 | A | | 12/1996 | Weil et al. | |
| 5,672,515 | A | | 9/1997 | Furlong | |
| 5,690,215 | A | | 11/1997 | Kimball et al. | |
| 5,697,366 | A | | 12/1997 | Kimball et al. | |
| 5,710,371 | A | | 1/1998 | Czernecki et al. | |
| 5,714,121 | A | | 2/1998 | Alderete et al. | |
| 5,771,891 | A | | 6/1998 | Gozani | |
| 5,788,631 | A | | 8/1998 | Fiddian-Green | |
| 5,789,253 | A | * | 8/1998 | Lauks et al. | 436/68 |
| 5,976,085 | A | | 11/1999 | Kimball et al. | |
| 5,980,830 | A | * | 11/1999 | Savage et al. | 422/81 |
| 6,016,683 | A | * | 1/2000 | Betts et al. | 73/1.03 |
| 6,055,447 | A | | 4/2000 | Weil et al. | |
| 6,071,237 | A | | 6/2000 | Weil et al. | |
| 6,136,607 | A | * | 10/2000 | Conlon et al. | 436/8 |
| 6,216,024 | B1 | | 4/2001 | Weil et al. | |
| 6,258,046 | B1 | | 7/2001 | Kimball et al. | |

* cited by examiner

CARTRIDGE FOR PACKAGING A SENSOR IN A FLUID CALIBRANT

TECHNICAL FIELD

The present invention relates generally to the packaging of a probe in a fluid calibrant. More particularly, the invention relates to a cartridge that contains a sensor, a probe and an analyte-containing fluid calibrant, wherein the sensor is responsive to the analyte.

BACKGROUND

Sensors and other devices associated with analyte detection often require calibration in order to ensure their accuracy in quantitating the concentration of analyte. In some instances, one or more calibrants that contain a known amount of analyte are employed, and the devices are calibrated by exposing the device to the one or more calibrants. To ensure that the calibrant conforms to an established standard, the calibrant is generally prepared under strict controls. Strict controls are particularly needed for liquid calibrants containing a solvated gaseous analyte because such calibrants are difficult to prepare. In addition, such calibrants have a relatively short shelf life under ordinary conditions. Accordingly, there is a need for readily made packages of calibrants with a long shelf life, i.e., that are chemically and physically stable over extended time periods.

Typically, liquid calibrants containing solvated gaseous analytes must be prepared under a controlled atmosphere to prevent the analyte concentration from deviating from a standard during preparation. This requires expert labor and expensive extra equipment, and results in uncertainty, as the preparation process may be technically complicated. For example, devices for blood gas analysis or other medical equipment often require a calibrant having a specific hydrogen ion concentration (pH), dissolved oxygen partial pressure ($pO_2$) and carbon dioxide partial pressure ($pCO_2$). Thus, the calibrant must be prepared or packaged under an atmosphere containing the appropriate analyte gas at a desired partial pressure. In addition, in order to obtain reliable data from the equipment, it is important that the pH, $pO_2$, and $pCO_2$ values of the calibrant be maintained within a specific and very narrow range after packaging and during shipping and storage. Moreover, since many calibrants are used for in vivo or in situ applications, such as with an indwelling arterial catheter as described in U.S. Pat. No. 4,830,013 to Maxwell, or with a paracorporeal system for bedside blood chemistry analysis as described in U.S. Pat. No. 5,976,085 to Kimball et al., they must be biocompatible and prepared under sterile conditions, and the sterility of the fluids must be maintained during shipping and storage.

Glass ampules and other rigid vessels have been employed to contain calibrants, as they typically exhibit sufficient robustness to maintain sterility and avoid degradation of the calibrants packaged therein. However, the use of glass ampules is accompanied by a number of disadvantages. As high temperatures are involved in sealing such ampules, specialized glassmaking equipment is typically required in their manufacture. In use, the calibrant contained in the ampules is accessed by breakage of the ampules. As is the case whenever glass is broken, glass fragments represent a safety concern, and technicians must be properly trained to break the ampules in a controlled manner. Another drawback is that used ampules constitute hazardous waste that requires special disposal procedures.

A number of patents describe the packaging of calibrants in a flexible container. For example, U.S. Pat. No. 3,892,058 to Komatsu et al. describes a process for preparing a flexible sealed package composed of a laminate of flexible sheet materials. The inner layer is composed of a heat-sealable resin, such as a polyamide. The outer layer is composed of a heat-resistant resin, such as a polyester film. Sandwiched between the inner and outer layers is a metal foil. In addition, U.S. Pat. No. 4,116,336 to Sorensen et al. describes the use of a flexible, gastight package to contain a fluid with dissolved $O_2$ and/or $CO_2$. The fluid may be used for calibrating or quality control monitoring of blood gas measuring equipment. The flexible container is a plastic-laminated metal foil, e.g., aluminum. The exterior surface of the metal foil is laminated with a plastic foil, such as a polyester film, to prevent scratching or the like. The inner surface of the metal foil is laminated with a plastic having low gas permeability and good weldability, such as polyvinylidene chloride or polyethylene terephthalate. The inner package is then sealed in an outer pouch that serves as a sterility barrier. The outer pouch may be, for example, a Tyvek®-backed polymeric material that is used as a storage medium for shipping the reference fluid. However, this type of flexible package suffers from a number of deficiencies. When fluids having gases dissolved therein are contained in so-called "gastight" flexible packages, they have a tendency to lose the dissolved gas by slow diffusion through the package, and therefore, have a limited shelf life.

To overcome the aforementioned problem, U.S. Pat. No. 5,690,215 to Kimball et al. describes a device for maintaining the partial pressure of an analyte, i.e., a dissolved gas in a fluid and related methods of use wherein the device comprises a first sealed, gas impermeable pouch containing a calibrant within a second sealed, gas impermeable pouch. A space between the pouches is charged with an atmosphere containing a gas at the same partial pressure as that of the analyte contained in the calibrant. This charged atmosphere prolongs the shelf life of the fluid to a greater degree than would be expected from merely encasing a first pouch within a second pouch.

However, it has been found that flexible pouches suffer from an inherent limitation, i.e., changing the overall shape of the package can alter the volume within the package. As a result, if any undissolved gas is present in such flexible pouches, the gas pressure therein may easily be change depending on external air pressure or by pouch deformation due to ordinary handling. Such pressure changes may result in error-prone calibration procedures. Thus, there is a need for packaged calibrant containing a gaseous analyte that does not suffer from this drawback.

Another problem associated with analyte detection involves probe or sensor contamination. Contamination is particularly problematic when in vivo analyte detection is desired. Even if prepackaged calibrants are sterile, a multiple-use probe or sensor of an analyte detection device adapted for in vivo detection must be sterilized before each use. Unlike laboratory personnel, hospital personnel are typically not trained to perform sterilization procedures. In addition, sterilization is time consuming and requires that the probes be constructed such that they can withstand sterilization conditions. In turn, these limitations increase the cost and lessen the desirability of in vivo analyte detection using multiple-use probes and sensors.

The contamination problem can be solved either by using a sterile disposable probe or a sterile disposable sheath to cover a multiple-use probe with a sterile calibrant. However, when the calibrant is packaged separately from such a disposable sheath or probe, a potential source of calibration error is introduced. Additional precautionary handling measures, for example, must be taken to avoid contaminating the disposable item before use in analyte detection. One such measure includes avoiding exposure of the disposable item to open atmosphere for an extended time period to decrease the possibility of contaminating the disposable item prior to calibration with the calibrant. In addition, separate packaging of the calibrant and the disposable probe or sheath tends to complicate inventory matters, requiring more storage space and an accurate count to ensure that there is no excess of either the calibrant or the sheath or probe.

Cartridges are known in the art that package sensors and calibrants together in a single unit. Typically, such cartridges are typically employed to overcome potential contamination problems. The construction of these cartridges, however, may be improved. For example, such cartridges typically require a user to perform a serious of complex steps to ensure the accuracy of sensor calibration. This represents a potential source of error. In addition, once known cartridges are opened, the sensor must be calibrated immediately. Any hesitation by the user tends to compromise the accuracy of calibration.

Accordingly, there is a need in the art for a cartridge in which to package a disposable probe with a fluid calibrant that contains an analyte, wherein the cartridge is constructed to decrease likelihood of error associated with calibration. There is also a need to improve ease of use of cartridges containing a probe and a fluid calibrant through procedures that allows for calibration without any intervention by a user.

SUMMARY OF THE INVENTION

Accordingly, it is a primary object of the invention to address the above-mentioned needs in the art by providing a convenient and novel cartridge for housing a disposable probe and a fluid calibrant.

It is another object of the invention to provide such a cartridge for maintaining a concentration of gas or other analyte dissolved in a fluid at a predetermined partial pressure that does not vary with respect to ambient atmospheric pressure.

It is a further object to provide a method for manufacturing the aforementioned cartridge.

It is yet another object of the invention to provide a method for calibrating a device for determining or quantitating the concentration of an analyte using the inventive cartridge.

Additional objects, advantages, and novel features of the invention will be set forth in part in the description that follows, and in part, will become apparent to those skilled in the art upon examination of the following, or may be learned by practice of the invention.

In a first embodiment, the invention relates to a cartridge for packaging a fluid calibrant containing an analyte. The cartridge includes: an analyte-impermeable container having an opening; a substantially analyte-impermeable sealing member sealing the opening; a probe; and a septum. The probe has an analyte-detecting portion and a connecting portion. The septum divides the container into a calibrant compartment that contains the fluid calibrant having a predetermined analyte concentration and an outer compartment that communicates with the opening. The probe extends sealingly through the septum such that the analyte-detecting portion of the probe is located in the calibrant compartment and the connecting portion is located in the outer compartment. Typically, the connecting portion of the probe allows the probe to be operatively connected to a device for quantitating or determining the concentration of the analyte. In some instances, the cartridge further includes an analyte-permeable and liquid-impermeable membrane that divides the calibrant compartment into a calibrant cell and analyte cell, wherein the calibrant cell contains the liquid calibrant and the analyte cell contains analyte.

In another embodiment, the invention provides a cartridge that similar to the above embodiment that includes an ahalyte-impermeable container defining a volume and having an opening, a fluid calibrant containing an analyte within the container, and a probe. The probe has an analyte-detecting portion, a sealing portion, and a connecting portion. The analyte-detecting portion of the probe is located within the container, and the sealing portion is adapted to seal the container opening. The connecting portion allows the probe to be operatively connected to a device external to the cartridge for quantitating or determining the concentration of the analyte while the sealing portion of the probe seals the container opening. Typically, the cartridge also includes an analyte-permeable membrane that divides the volume into a calibrant compartment containing the fluid calibrant and an outer compartment that communicates with the opening. In such a case, the probe extends through the analyte permeable membrane and the analyte detecting portion of the probe is located in the calibrant compartment.

In a further embodiment, a cartridge is provided that includes: an analyte-impermeable container having an opening; a substantially analyte-impermeable sealing member adapted to seal the opening; and a membrane that divides the container into a calibrant compartment containing the fluid calibrant and an outer compartment that communicates with the opening. The cartridge is adapted to allow a probe having an analyte-detecting portion to extend through the opening of the container and to sealingly pierce through the membrane such that the analyte-detecting portion of the probe is placed in the calibrant compartment.

Any of the above cartridges may be used for calibrating a device for quantitating or determining the concentration of an analyte. Thus, the device may be adapted for blood or tissue analysis. Similarly, the above cartridges may include one or more sensors responsive to the analyte. Typically, sensors are contained in the probe, communicate with the calibrant compartment through the analyte-detecting portion of the probe and are operatively connected to the connecting portion of the probe.

In a further aspect, the invention relates to a method for preparing a cartridge containing a calibrant and a probe. The method involves providing an analyte-impermeable container having an opening. A septum having a predetermined gas permeability is inserted into the container to divide the container into a calibrant compartment and an outer compartment such that the calibrant compartment contains a fluid calibrant and the outer compartment communicates with the opening. In addition, a probe having an analyte-detecting portion and a connecting portion is positioned within the container such that the probe extends sealingly through the septum, the analyte-detection portion is located in the calibrant compartment, and the connecting portion is located in the outer compartment. The container is filled with a sufficient amount of analyte so as to allow the fluid calibrant to stabilize at a predetermined analyte concentration. Optionally, this is carried out through an incremental filling of the container. The opening is then rendered substantially analyte-impermeable.

By precise control overt the temperature to which the cartridge is exposed, the geometry of the probe and the container, and the constituents and concentration of the calibrant, response time and performance of the probe can be optimized.

For any of the above cartridges, the calibrant compartment may be divided into a calibrant cell and analyte cell by an analyte-permeable membrane such that the calibrant cell contains fluid calibrant and the analyte cell contains analyte. In some instances, the analyte is a gas, e.g., $CO_2$, CO, $O_2$, or NO. In addition or in the alternative, the calibrant may contain a liquid such as water or a buffered aqueous solution. The calibrant may further contain an additive selected from an acid, base, phosphate, carbonate, bicarbonate, organic compound, or salt or any combinations thereof.

Optionally, the septum has a predetermined permeability selected to prevent analyte concentration in the calibrant from deviating outside a desired range for a time period of at least about 1 minute after continuous exposure of the outer compartment to atmospheric conditions. Preferably, the time period is at least about 5 minutes. In some instanced, the septum is puncturable and/or self-sealable. The septum may be composed of an elastic material such as silicones, urethanes, fluorinated polymers, nitrile rubbers, alkylene rubbers, diene rubbers, mixtures thereof, and copolymers of any of the foregoing. In some instances, the septum renders the probe substantially immobile with respect to the container. The outer compartment typically contains the analyte at equilibrium with the analyte in the calibrant compartment.

Further optionally, the container may sufficiently rigid such that the analyte concentration within the calibrant compartment does not substantially change due a difference in pressure between the inside and outside of the cartridge. Although the cartridge may be constructed to with stand a difference in pressure of up to about 760 torr, ordinarily, the cartridge may encounter a pressure difference of no more than about 76 torr. In the alternative, the container may be flexible.

The cartridge may be sealed using one or more of the following: a cap, lid, foil, laminate, cover, plug, insert, bag, septum, weld and can.

BRIEF DESCRIPTION OF DRAWINGS

The invention is described in detail below with reference to the following figures:

FIG. 1 also shows an indicating means adapted for operative connection with the probe of the cartridge.

DETAILED DESCRIPTION OF THE INVENTION

Definitions and Nomenclature

Figure 1:
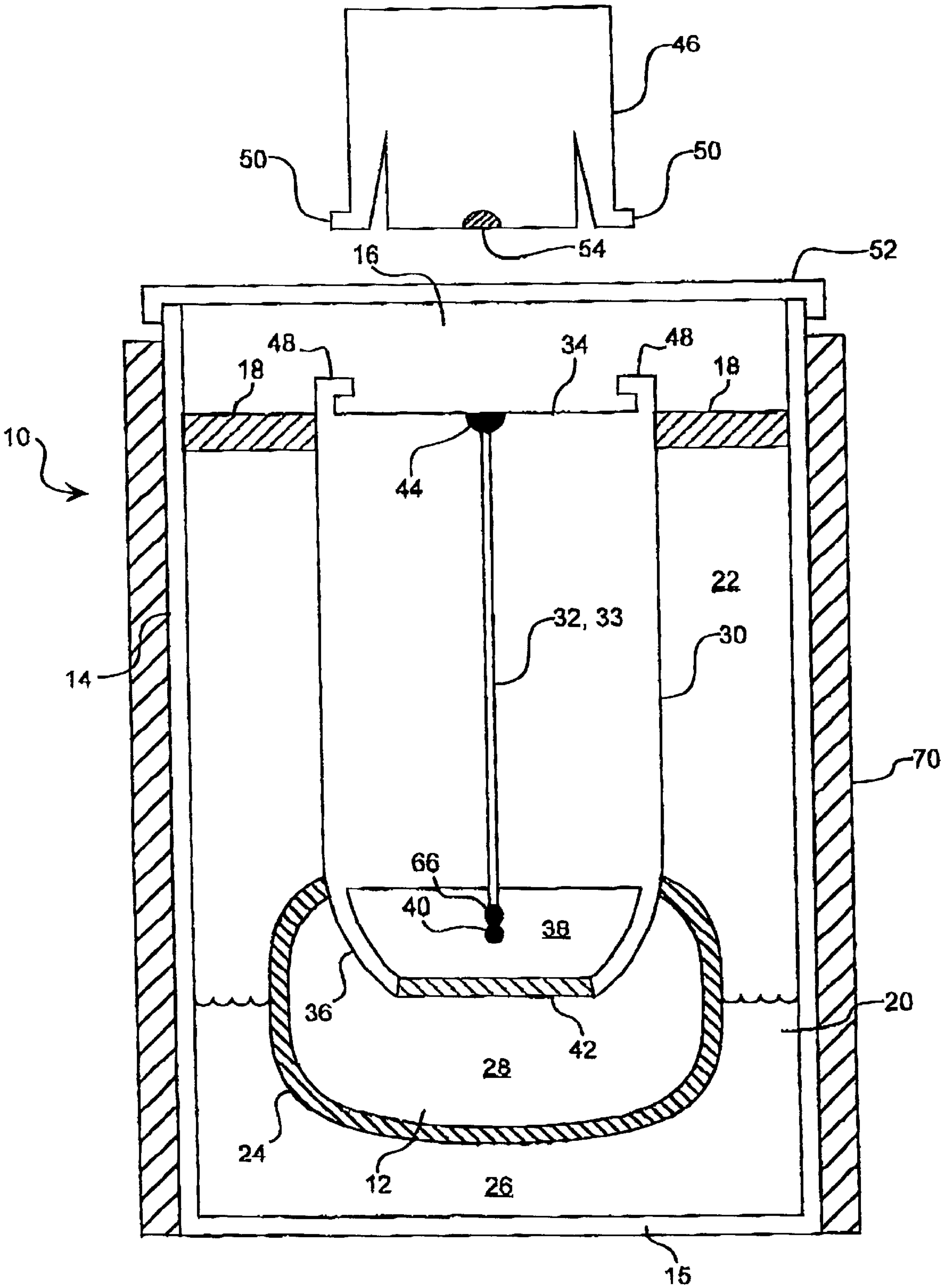
FIG. 1 schematically illustrates in cross-sectional view a sealed cartridge of the present invention formed from a container having a septum therein that divides the container into a calibrant compartment and an outer compartment. In addition, the cartridge contains a generally elongated conical probe having an analyte-detecting portion at the tip of the probe exposed to an analyte within the calibrant.

Before the inventive devices and methods are disclosed and described, it is to be understood that this invention is not limited to sensor designs, measurement techniques, or the like, as such may vary. It is also to be understood that the terminology used herein is for the purpose of describing particular embodiments only and is not intended to be limiting.

It must be noted that, as used in the specification and the appended claims, the singular forms "a," "an," and "the" include both singular and plural referents unless the context clearly dictates otherwise. Thus, for example, reference to "an analyte" includes a single analyte as well as combinations of analytes, reference to "a calibrant" indicates one or more calibrants, reference to "a connector" includes a single connector or a plurality of connectors, and the like.

The term "calibrant" as used herein refers to a substance, typically liquid, that contains an analyte or an analyte equivalent in a predetermined proportion. The calibrant is used as a reference in calibrating an instrument for quantitating or determining the concentration of the analyte in a sample. The calibrant typically contains water or an aqueous solution. Buffered solutions known in the art or to be developed may serve as a component or the entirety of the calibrant. Additionally, if the calibrant is employed to calibrate a sensor or a device to be used to detect for the presence or quantitate the level of an analyte of a living subject, the calibrant is preferably biocompatible with respect to the living subject.

The term "septum" as used herein is not intended to be limited to a flexible, puncturable material. Rather, the septum may be described as an analyte impermeable member. This member may be rigid and/or solid with a small outer seal such as an O-ring to seal between the can and the "septum." Gases could then be filled with needles puncturing the O-ring or some other puncturable and resealable material located on the rigid "septum." Alternatively, the septum or analyte impermeable member may be made of a flexible material that sealingly engages the can and the "septum."

The term "patient" as used herein means a mammalian subject, preferably a human subject, that has, is suspected of having, or is or may be susceptible to a condition associated with the analyte, or is in need of analyte measurement.

The term "probe" as used herein refers to a solid member in any shape, including but not limited to tubular, cylindrical, or sheath-like, adapted to be placed within a patient for analyte detection. A probe typically contains at least one sensor for analyte detection but may or may not contain a sensor when included as a part of the inventive cartridge.

The term "sealingly" as used herein refers to contact between two objects in a manner such that an interface formed due to contact between the objects is no more calibrant-permeable or transmissive than the more permeable of the two objects. Thus, for example, the interface formed by "a probe extending sealingly through a septum" is not more calibrant-permeable or transmissive than both the septum and the probe.

The term "septum" as used herein is a partition that divides a volume into two regions. For a volume defined within a container and by container walls, a septum may or may not contact a wall in order to divide the volume into two regions.

The Device and Method of the Invention

The present invention relates to a cartridge for packaging a fluid calibrant containing an analyte. The cartridge is formed from an analyte-impermeable container that has an opening. A septum serves to divide the container into a calibrant compartment that contains the liquid calibrant and an outer compartment in fluid communication with the opening. The container is constructed such that a probe may be disposed therein comprising an analyte-detecting portion and a connecting portion that allows for operative connection between the probe and a device for quantitating or determining the concentration of the analyte. Such a device, for example, may have an indicating means for indicating the quantitation or determination of the analyte concentration made by the device. The probe may extend sealingly through the septum such that the analyte-detecting portion is located in the calibrant compartment and the connecting portion is located in the outer compartment. In some instances, the analyte-detecting portion is constructed from an analyte-permeable, liquid-impermeable material and may contain an analyte sensor. A substantially analyte-impermeable sealing member is provided to seal the opening of the container. The construction of the cartridge allows for user-friendly, nearly "invisible" and error-free probe calibration for analyte detection. The invention also relates to a method of manufacturing the above cartridge as well as a method for using the above cartridge in calibrating a device for quantitating or determining analyte concentration.

The invention is described herein with reference to the figures. The figures are not to scale, and in particular, certain dimensions may be exaggerated for clarity of presentation. FIG. 1 schematically illustrates in cross-sectional view an embodiment of the invention. This embodiment provides a cartridge 10 for packaging a fluid calibrant 12 containing a predetermined analyte concentration. A generally rigid, cylindrical and analyte-impermeable container 14 is provided that has a closed end 15 and an opening 16 at the opposing end. The container may be made from any rigid, gas-impermeable material, including but not limited to aluminum, nickel, steel, glass, ceramics, and the like. In the alternative, the container may be made from a flexible material such as metal foils, polymeric films, laminates and the like. Regardless of whether the container is rigid or flexible, metallic (e.g., aluminum), ceramic (e.g., silicon dioxide), or polymeric (e.g. parylene) coatings may be employed as well. The container is preferably made from opaque materials if light may have an undesired effect on the composition of the calibrant or any other component within the container. In addition, as with all materials used in the cartridge, absorption or reaction of the container material with respect to the analyte and/or calibrant must be accounted for. A septum 18 divides the container 14 into a calibrant compartment 20 at the closed end and an outer compartment 22 at the other end. An optional analyte-permeable and liquid-impermeable membrane 24 may be used when the calibrant is a liquid. Such a membrane 24 is depicted in FIG. 1 dividing the calibrant compartment 20 into an analyte cell 26 and calibrant cell 28. The calibrant cell 28 contains the fluid calibrant 12 having an analyte of known concentration analyte. Due to efficient analyte diffusion through membrane 24, the analyte cell 26 contains analyte in equilibrium with the analyte contained within the calibrant cell 28.

Sealingly extending through the septum 18 is a probe 30 containing a sensor 32. The sensor 32 is immovably mounted and optionally sealed within the probe 30. The probe is generally in the shape of a tapered cylinder or a cone having a proximal end 34 and a pointed distal end 36. Defined within the distal end 36 is an analyte-sensing region 38 that contains the analyte-sensitive portion 40 of sensor 32. Analyte-sensing region 38 communicates with the calibrant cell 28 through optional analyte-permeable membrane 42 at the pointed distal end 36. The sensor 32 includes optional optical fiber 33 that extends along the axis of the probe and terminates at the proximal end 34 of the probe as a sensor connector 44 for operative connection with an indicating means 46 that represents a component of a device for quantitating or determining the concentration of an analyte. A mating coupling 48 is constructed as an integral part of proximal end 34 to engage a complementary coupling 50 of the indicating means 46 to immobilize and attach the probe therewith. An optional temperature sensing means 66 is provided as well.

The probe 30 may be composed of a flexible material that allows for elastic deformation in response to a force. Such deformation may allow the probe and the sensor to be secured adjacent to a surface of a patient's tissue without substantially blanching the tissue as disclosed in a commonly owned patent application filed on even date herewith entitled "NONINVASIVE DETECTION OF A PHYSIOLOGIC PARAMETER WITHIN A BODY TISSUE OF A PATIENT" (U.S. Pat. Ser. No. 10/162,028, filed Jun. 3, 2002). A substantially analyte-impermeable sealing member in the form of a cap 52 is constructed to seal opening 16. It should be noted that the sealing member may be constructed in different forms that include, but are not limited to, caps, lids foils, laminates, covers, plugs, inserts, bags, and septa. Further, the sealing member may be affixed over the opening in different ways, such as through heat sealing, clamping, friction, adhesion, canning, welding and other ways known in the art. In operation, the sensor 32 is adapted to quantitate or determine the concentration of analyte transmitted through in the analyte-sensing region 38.

Also shown in FIG. 1 is an indicating means 46 adapted for attachment with the probe of the cartridge through complementary coupling 50. The complementary coupling is constructed to releasably engage the mating coupling 48 and to immobilize the probe with the indicating means 46 such that the sensor connector 44 is operatively connected with the sensor interface 54 of the indicating means. Removing the sealing member 52 allows the indicating means 46 access to the probe 30. Since sensor 32 is exposed to calibrant 12, calibration of the sensor, as described in detail below, may take place when the probe is operatively connected to the indicating means. Once calibration has been performed, the probe may be physically separated from contact with calibrant 12 in the calibrant cell 28 and removed from the container 14 to allow sensor 32 to be placed in the environment to be assayed, such as adjacent to a tissue of a patient to detect analyte transported through optional analyte-permeable membrane 42. Once used, the probe may be detached from the indicating means for disposal or for disinfection and repackaging for further use. As illustrated, the sensor represents a permanently affixed portion of the probe. Thus, if the probe is disposable, the sensor may also be disposable.

Figure 2:
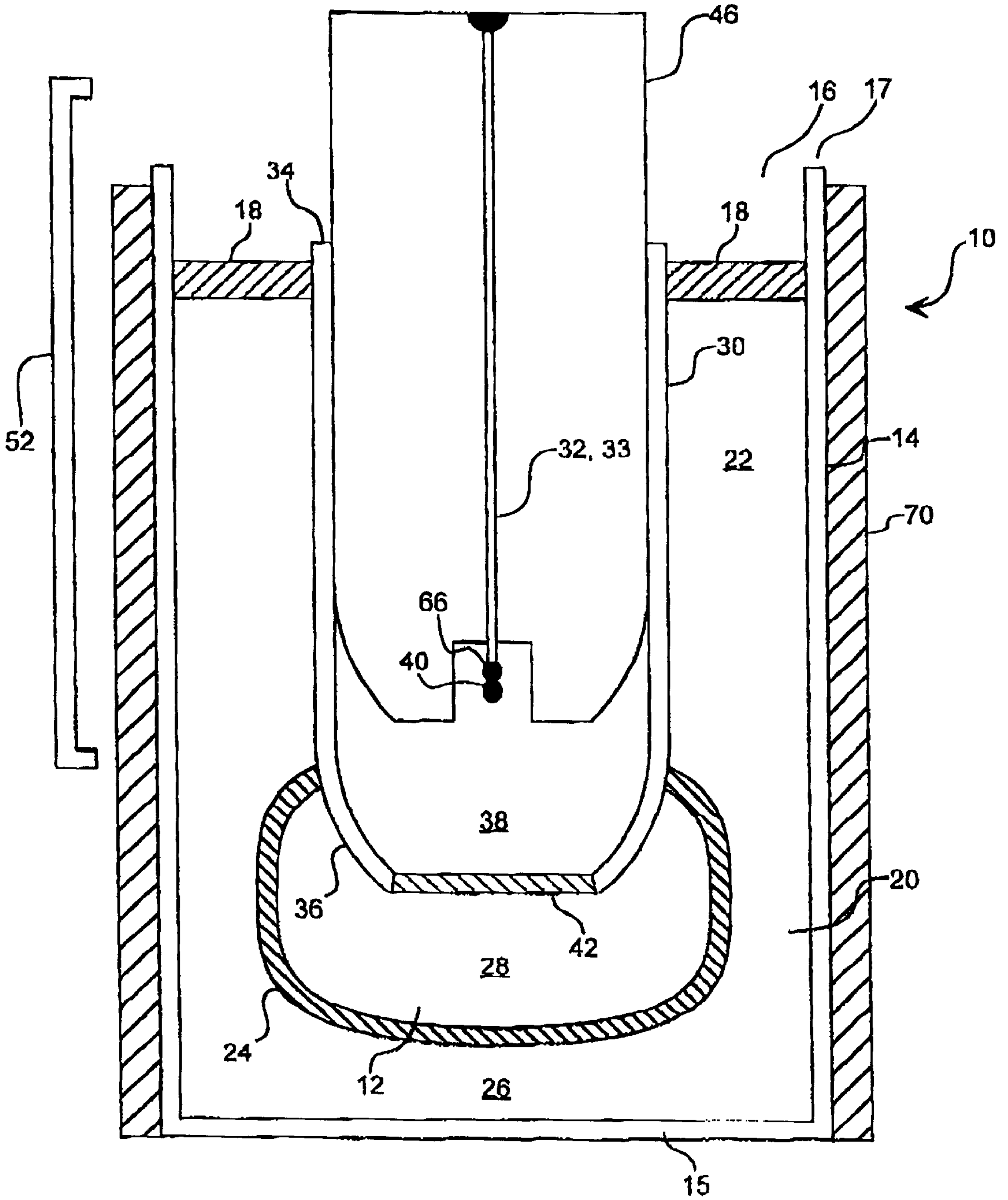
FIG. 2 schematically illustrates in cross-sectional view another cartridge of the invention that has been unsealed and positioned for attachment with another indicating means that is operatively connected with a sensor.

FIG. 2 schematically illustrates in cross-sectional view another embodiment of the invention. This embodiment also provides a cartridge 10 for packaging a fluid calibrant 12 containing an analyte. This cartridge is similar to the cartridge of FIG. 1 in a number of ways. For example, this cartridge is formed from a generally rigid, cylindrical and analyte-impermeable container 14 that has a closed end and an opening 16 at the opposing end 15. The container 14 of this cartridge is also divided by a septum 18 into a calibrant compartment 20 at the closed end and an outer compartment 22 at the opposing end. An analyte-permeable and liquid-impermeable membrane 24 divides the calibrant compartment 20 into an analyte cell 26 and a calibrant cell 28. Extending sealingly through septum 18 is a probe 30 that is in the shape of a tapered cylinder or cone having an open proximal end 34 and a pointed distal end 36. An analyte-sensing region 38 within the probe communicates with the calibrant cell through analyte-permeable membrane 42 at the pointed distal end. However, the cartridge of FIG. 2 does not contain a sensor that is permanently attached to the probe.

Sealing member 52 as illustrated in FIG. 2 has been removed from the cartridge, and the cartridge is ready for operative attachment to a device for quantitating or determining the concentration of the analyte. The device comprises a sensor 32 operatively attached to indicating means 46. The sensor has an analyte-sensitive portion 40 at the distal end to the indicating means. The indicating means is shaped to allow for its insertion into the open proximal end 34 of the probe 30. Once inserted, the indicating means and the probe are frictionally engaged to render the indicating means temporarily immovable with respect to the probe. In addition, when the sensor is inserted into the probe, the analyte-sensitive portion 40 of the sensor is positioned within analyte-sensing region 38 at the pointed distal end for calibration as described in detail, infra. After calibration, the indicating means 46 and the attached probe may be removed from the container for use in analyte detection. As shown, the device also includes optional temperature sensing mean 66.

For either cartridge of FIGS. 1 and 2, the optional analyte-permeable liquid-impermeable membrane 42 may be composed of a polymeric material. It is evident that the membrane material is selected for analyte transmission properties. In addition, it is desirable that such a membrane be sufficiently thin or analyte-permeable to ensure sufficiently fast analyte transmission for quick sensor response. In order to ensure accurate and rapid calibration, the membrane should be positioned such that the calibrant cell 28 exhibits a relatively large volume as compared with the analyte-sensing region 38. One suitable membrane material is silicone-based polymer. Silicone polymers are generally permeable to gaseous analyte such as oxygen and $CO_2$ but do not allow liquid water to be transmitted therethrough, which could affect the performance of the sensor. Other common polymers that exhibit permeability to analytes but are substantially impermeable to water include, but are not limited to, fluoropolymers such as polytetrafluoroethylene and polyhexafluoropropylene, other halogenated polymers such as polyvinylidene chloride, and polyvinylchloride, elastomers such as latex rubber, and polyalkalenes such as polyethylene and polypropylene. It should be noted that this membrane is optional for most sensors but must be used for "wet" sensor types, such as the Severinghaus sensor, discussed below. This membrane is typically included for instances wherein the sensor is packaged within the cartridge.

In addition, septum 18 for FIGS. 1 and 2 may each be composed of an elastic material that exhibits the desired mechanical and analyte transport properties. First, the material should exhibit mechanical properties that allow the septum to render the probe substantially immobile with respect to the container. Second, the material should exhibit analyte permeability sufficient to prevent analyte concentration in the calibrant from deviating outside a desired range for a time period under continuous exposure of the outer compartment to atmospheric conditions. The time period must be sufficient to allow for calibration of the sensor. In this way, the concentration of analyte in the calibrant does not substantially change during calibration.

It should be noted, however, that the material is preferably at least somewhat analyte permeable, particularly when the analyte is a gas. From a manufacturing perspective, permeability allows an analyte introduced into the outer compartment 22 to diffuse through the septum and thereby allowing the calibrant to absorb the analyte from the outer compartment over time. Thus, for any closed container that is separated into two compartments by a septum, the outer compartment containing pure analyte and the calibration compartment containing no analyte, the septum should allow analyte diffusion to take place therethrough such that equilibrium is reached in no more than 72 hours. Preferably, equilibrium may be reached within 24 hours. Optimally, equilibrium may be reached in not more than 8 hours. Examples of suitable materials for septum construction include silicones, urethanes, fluorinated polymers, nitrile rubbers, alkylene rubbers, diene rubbers, mixtures thereof, and copolymers of any of the foregoing. In some instances, other polymers such as polyethylene (high or low density) and acrylics and be used as well. Typical silicone septa exhibit a thickness of about 1 mm to about 30 mm, preferably about 5 mm to about 25 mm, and optimally about 15 mm to about 25 mm.

For any cartridge of the invention, including but not limited to the cartridges described above, the sensor is selected according to its sensitivity or response to analyte concentration. The sensor may be responsive to analyte concentration through a chemical reaction with a reactant, through absorption or emission of electromagnetic radiation, through generation or alteration of electromagnetic radiation, or through a combination of any of the foregoing. For example, Severinghaus $CO_2$ sensors may operate by detecting a chemical reaction with a reactant in response to change in pH in the sensor environment. Specifically, such sensors have a membrane that is permeable to $CO_2$, and that separates a sodium bicarbonate or carbonic acid ($H_2CO_3$) solution from the environment. A pH sensor in the device measures the pH of the sodium bicarbonate solution. An exemplary $CO_2$ sensor of this type is manufactured by Microelectrode, Inc.

In addition, a number of different types of optical sensors may be employed in the present inventive device. For example, conventional calorimetric and fluorimetric optical sensors for $CO_2$ are known in the art. Such sensors have been incorporated into plastic film $CO_2$ sensors, such as those described in U.S. Pat. No. 5,480,611 to Mills et al. Generally, such $CO_2$ sensors rely upon pH changes induced in an aqueous solution upon its exposure to different levels of $CO_2$and utilize a pH-sensitive dye to provide a qualitative and/or quantitative measure of the extent of the change in pH and, therefore, the change in $CO_2$ concentration. These sensors have similar design features such as those that involve the encapsulation of a pH-sensitive dye, either in a thin aqueous solution or fixed on an inert support. Optionally, these sensors include a fiber optic system for delivery and return of the essential radiation components When a fiber optic system is employed, the sensor may include a single optical fiber. Structures, properties, functions, and operational details of fiber optic chemical sensors can be found in various patents and publications, such as those listed in U.S. Pat. No. 6,071,237 to Weil et al. Such optical sensors may be adapted for use in monitoring a patient's arterial oxygen saturation level, as described in U.S. Pat. No. 5,111,817 to Clark et al., or for use in monitoring $pCO_2$, as described in U.S. Pat. No. 5,714,121 to Alderete et al. An optical sensor 32 responsive to an analyte, for example, may be composed of a single optical fiber 34, as shown in FIGS. 1 and 2, having an analyte-sensitive portion 40 at one end and, at the other end, a connector 44 for communication with indicating means 46.

The analyte-sensitive portion 40 contains an indicator solution having a suitable analyte-sensitive indicator component, generally a fluorescent dye, and no air. Examples of fluorescent dyes include without limitation: fluorescein, carboxyfluorescein, seminaphthorhodafluor, seminaphthofluorescein, naphthofluorescein, 8-hydroxypyrene 1,3,6-trisulfonic acid, trisodium salt ("HPTS"), and dichlorofluorescein, with HPTS particularly preferred. In operation, radiation of a predetermined wavelength is directed from an external source (not shown), through an optical fiber 33 impinging on the encapsulated indicator composition in the analyte-sensitive portion 40, which is exposed to the analyte at equilibrium with analyte concentration. As a result of interaction with radiation and the analyte, the indicator composition emits fluorescent light that returns along the optic fiber 33. The intensity of the fluorescent light is related to the concentration of analyte. The emitted light is carried to the connector 44 to be detected and converted electronically to an analyte concentration value as indicated by the indicating means 40. This type of sensor, as with all Severinghaus $pCO_2$ sensors, however, may require that the indicator composition be maintained at a particular moisture level not required by the infrared sensors as described above. Thus, an analyte-permeable, liquid-impermeable membrane 42 is required for Severinghaus sensors.

As an alternative to Severinghaus sensors, a probe of a preferred embodiment may contain an infrared sensor that employs non-dispersive infrared (NDIR) technology. One example of such a sensor is described in U.S. Pat. No. 5,423,320 to Salzman et al. This patent describes an infrared light source coupled to a first infrared light transmissive optical fiber. Infrared light is transmitted from the light source through a first optical fiber and to an analyte-sensing region of the sensor containing analyte that is to be analyzed. The light is allowed to interact with the analyte before an infrared reflector within the region directs the infrared light emitted from the first optical fiber into a second optical fiber coupled to an infrared detector. Alternatively, a single fiber optic could be used if an optical splitter means were also deployed to separate the emitted energy from the excitation energy. The signal detected by the detector is compared with the signal generated by a known calibration level to produce an output that indicates the level of analyte in the detection region. Oxygen and carbon dioxide, as well as other gases, can generally be measured with an NDIR technique. Some gases may be affected by the presence of other gases, and compensation may be required.

Salzman et al. also describes that $pCO_2$ and $pO_2$ may be measured using a Severinghaus electrode based $CO_2$ sensor and a Clark electrode $pO_2$ sensor, respectively, each of which can be used in the present invention as well. Where a Severinghaus electrode is used in place of an infrared sensor, electrical signal lines are used in place of fiber optics, and an external electrical signal generator is used in place of the infrared light source. The construction as well as the limitations of various Severinghaus sensors is known in the art, one example of which is described in Vurek et al. (1983), "A Fiber Optic $PCO_2$ Sensor," *Annals of Biomedical Engineering*, 2:499–510. For example, Severinghaus sensors require a specific moisture level for accurate analyte detection or quantitation and thus are merely an optional, and not preferred type of sensor.

Thus, any of a number of sensors, or combination thereof, may be contained in the inventive cartridge. In addition to those described above, the sensor may be constructed as a saturation sensor or an electrochemical sensor. Similarly, as the calibrant is used as a reference in calibrating a device or measurement system for quantitating or determining the concentration of the analyte in a sample, the calibrant is selected to according to the analyte for which the sensor is selected to detect. The analyte may be a gas, e.g., $CO_2$, CO, $O_2$, argon, helium, or NO. In addition, or in the alternative, the analyte may exist in nongaseous form. Thus, the calibrant may contain hydrogen ions or other biological analytes, the presence of which may be desirable to assess in a physiologic fluid, e.g., glucose, potassium, calcium, NAD(H) FAD, ATP, ADP, and the like. Typically, the calibrant contains water and, optionally, an additive selected from an acid, base, phosphate, carbonate, bicarbonate, organic compound, salt, or fluorocarbon-based synthetic buffer. The composition of and methods for preparing calibrants are well known in the art. Such compositions are described in, for example, U.S. Pat. No. 3,380,929 to Petersen; U.S. Pat. No. 3,681,255 to Wilfore et al.; and U.S. Pat. No. 4,116,336 to Sorensen et al.

As an example of how the inventive cartridges allow ease in calibration, calibration using the cartridge of FIG. 1 is now described. A sealed cartridge is provided such that analyte concentration within the entire container is in equilibrium. In addition, an indicating means is provided as described above. The indicating means is constructed with an integrated complementary coupling for operative connection with the mating coupling of the probe. When the sealing member is removed from the cartridge, the indicating means is provided access for operative connection with the probe within the container of the cartridge. The indicating means 46 is attached to the probe 30 of the cartridge when the complementary coupling 50 engages the mating coupling 48 of the probe. As a result, the probe is immobilized with respect to the indicating means 46, and the sensor connector 44 is operatively connected with the sensor interface 54 of the indicating means. Upon the generation of light of a predetermined wavelength by the indicating means 46, the optical fiber 33 directs the light toward the analyte-sensitive portion 40. When analyte is present in the indicator composition within the capsule at the analyte-sensitive portion, the capsule emits fluorescent light of an intensity that corresponds to analyte concentration, and the emitted light returns along the fiber 33 to be detected by indicating means 46. Since the permeable portion of the probe allows the interior of the probe to be in analyte communication with the calibrant, the atmosphere within the probe is at substantially the same partial pressure with respect to the analyte as the analyte itself when the sensor is inserted within the probe.

To calibrate the sensor of FIG. 1, light of a predetermined wavelength is directed from the indicating means, through the optical fiber 33, impinging on the indicator composition which is exposed to the analyte at equilibrium with analyte concentration in the calibrant. Because of interaction with light and the analyte, the indicator composition emits fluorescent light that returns along the fiber 33. The intensity of the fluorescent light is related to the concentration of analyte in the calibrant. The emitted light travels along the optical fiber 33 to the indicating means where the emitted light is detected and serves as reference for further analyte concentration readings. Typically, this calibration procedure occurs quickly, over a fraction of a second to a few seconds. As a result, a user may not be aware that calibration has occurred, and the calibration is essentially "invisible" to the user.

Once calibrated, the probe is removed from the container and is ready for use. The permeable membrane of the probe is placed adjacent to a region where analyte detection is desired.

From the above description, one of ordinary skill in the art should be able to perform probe calibration using any of the inventive cartridges. In addition, for either cartridge of FIGS. 1 and 2, calibration must be performed before the analyte concentration in the calibrant substantially changes from exposure to the open atmosphere. While the septum may delay analyte from diffusing into or out of the calibrant cell, given sufficient time, analyte concentration will eventually deviate to a degree to render the calibrant useless for its intended purpose. Thus, should analyte concentration within the calibrant cell should not deviate from a predetermined concentration range to enable calibration to take place for at least one minute after cartridge is opened. Preferably, the cartridge allows for accurate calibration for at least 5 minutes. Optimally, the cartridge allows for accurate calibration for at least 30 minutes after the cartridge is opened.

Figure 3:
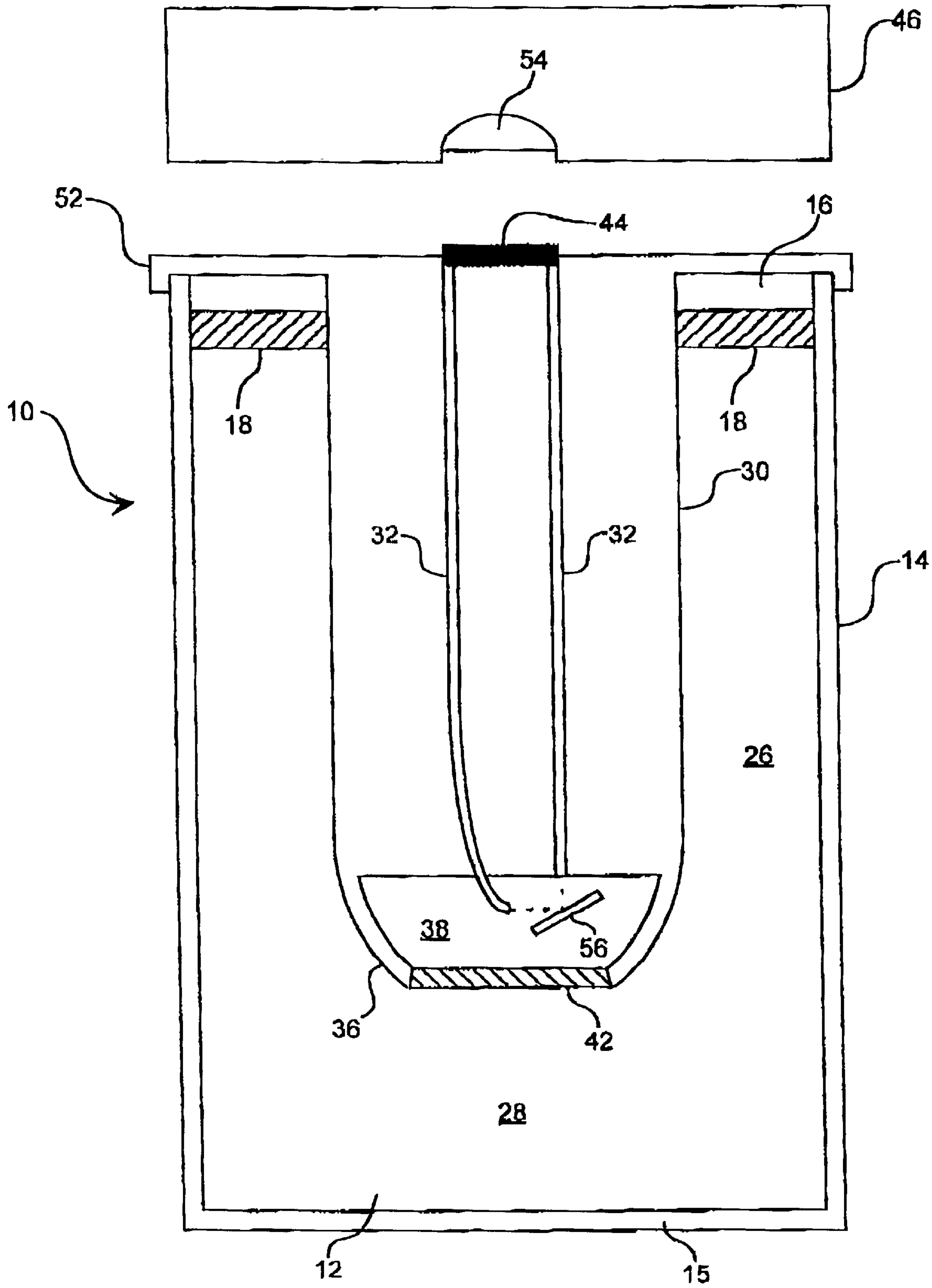
FIG. 3 schematically illustrates in cross-sectional view a cartridge that allows for an indicating means to be operatively connected with a probe of the cartridge without providing analyte communication between the interior and the exterior of the cartridge.

FIG. 3 schematically illustrates in cross-sectional view a cartridge that allows for an indicating means to be operatively connected with a probe without first exposing the calibrant within the cartridge to exterior atmosphere. In this embodiment, a cartridge 10 is provided for packaging a fluid calibrant 12 containing an analyte. This cartridge is formed from a generally rigid, cylindrical, and analyte-impermeable container 14 that has a closed end and an opening 16 at the other end. The volume in the container is divided into an analyte cell 26 and a calibrant cell 28 by a septum 18 in the form of an analyte-permeable and liquid-impermeable membrane. A probe in the shape of a tapered cylinder, or cone, having a proximal end 34 and a pointed distal end 36 is positioned within the cartridge 10. An analyte-sensing region 38 within the probe communicates with the calibrant cell through optional analyte-permeable membrane 42 at the pointed distal end. The sensor 32 of this probe, however, is an infrared sensor as described above and includes two optical fibers indicated at 33 and 35, respectively, that generally extend along the length of the probe and terminate at the proximal end of the probe to form the sensor connector 44 for operative connection with an indicating means 46. In addition, a reflector 56 is positioned in the analyte-sensing region to redirect radiation that emerges from one fiber into the other. As shown, sealing member 52 is either permanently affixed to the probe or an integral part of the probe. Thus, the sensor connector 44 is located outside of the container 10 and allows the sensor to be connected to the indicating means without removing the sealing member to open the container.

In operation, sensor interface 54 of indicating means 46 is operatively connected to sensor connector 44 of the probe 30 for calibration to allow transmission of electromagnetic radiation between the indicating means and the sensor. Electromagnetic radiation such as infrared light is generated and transmitted from the indicating means 46 through one of the two optical fibers and to an analyte-sensing region 38 of the probe 30 that contains analyte that is to be measured. The radiation is allowed to interact with the analyte before the infrared reflector 56 within the analyte-sensing region 38 directs the infrared radiation emitted from the optical fiber into the other optical fiber to return to the indicating means 46. The returning signal is detected and measured by the indicating means 46. In addition, the returning signal is compared with the originally generated signal. Since the analyte-sensing region contains a known concentration of analyte at equilibrium with the calibrant, the signal may be used as a reference against which later measurements may be compared. When calibration is complete, the probe may be removed from the container and is ready for analyte detection.

In certain instances, the sensor may respond differently to an analyte, depending on the temperature of the sensor or analyte. Thus, to ensure proper analysis of the signals from the detector, the temperature of the sensor may have to be determined and taken into account. Temperature may be measured through use of a temperature sensing means such as thermocouple, resistive thermal device, or other thermal sensors. Such temperature sensing means may be either permanently or otherwise attached to the indicating means or the probe to measure the temperature of the sensor. In either case, the thermocouple is adapted to measure temperature in the analyte-sensing region. The indicating means is constructed to allow the thermocouple to be inserted into the opening of the probe and allow for operative connection with the connector of the sensor. Once connected, the indicating means indicates the concentration of the analyte that is adjusted for temperature as measured by the thermocouple. Since probe and optional sensor may be employed as a part of a comprehensive evaluation of the physical status of the patient, the inclusion of a thermocouple provides the added benefit of independent contribution to such evaluation.

Also, the cartridge itself may be constructed to lessen any potential adverse effects that changes in cartridge temperature may bring about. For example, when a user holds the cartridge to carry out probe calibration, heat from the user's hand may raise the overall temperature of the cartridge. Thus, as illustrated in FIGS. 1 and 2, the inventive cartridge may include an external insulation layer 70 to slow the transfer of heat to the calibrant and analyte within the cartridge. Other factors that affect thermal stability include spacing and the heat capacities of the materials associated with the cartridge. Typically, liquids and solids have a higher heat capacity than gases. Thus, in order to increase thermal stability of the cartridge, it is preferred that the cartridge exhibits a high liquid and/or solid to gas mass ratio.

Figure 4:
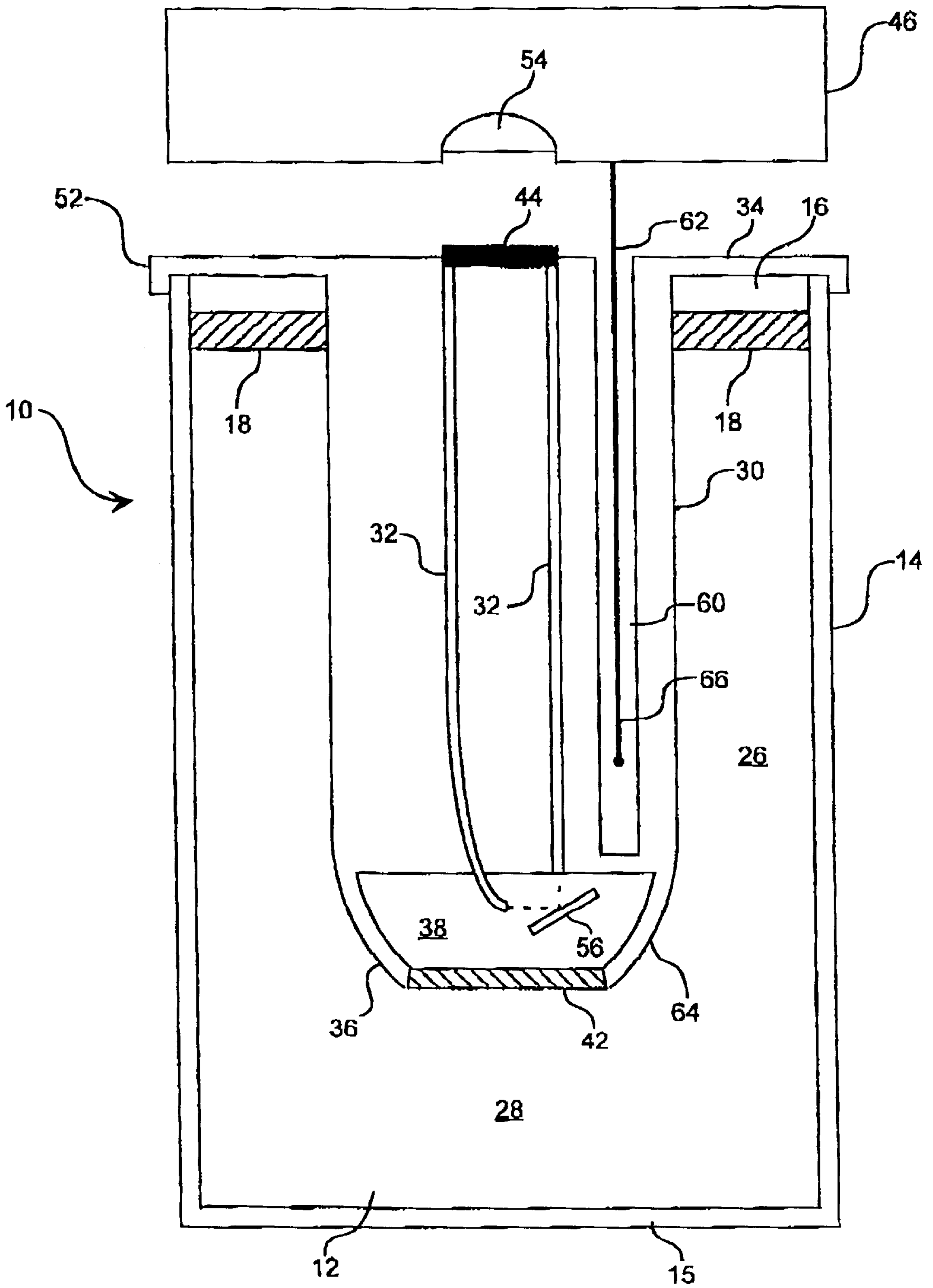
FIG. 4 schematically illustrates in cross-sectional view a cartridge similar to that illustrated in FIG. 3 with a thermocouple.

FIG. 4 illustrates a cartridge similar to that illustrated in FIG. 3, which allows for an indicating means to be operatively connected with a probe without first exposing the calibrant within the cartridge to exterior atmosphere. However, a longitudinal bore 60 is provided extending from opening 62 at the proximal end 34 of the probe and terminates near the analyte-sensing region 38 at the distal end 64 of the probe 30. Also shown is an indicating means 46 having a sensor interface 54 and a thermocouple 66 that extends from indicating means 46. The thermocouple 66 may represent a disposable or reusable unit that may be permanently or detachably affixed to indicating means 46

In operation, thermocouple 66 is inserted into bore 60 and sensor interface 54 of the indicating means 46 is operatively connected to sensor connector 44 of the probe 30 for calibration. As before, infrared radiation is generated and transmitted from the indicating means 46 through one of the two optical fibers and to an analyte-sensing region 38 of the probe 30 that contains analyte to be measured. The radiation is allowed to interact with the analyte before the infrared reflector 56 within the analyte-sensing region 38 directs the radiation emitted from the optical fiber into the other optical fiber to return to the indicating means 46. The signal detected by the indicating means 46 is compared with the originally generated signal. Since the analyte-sensing region contains analyte at equilibrium with the calibrant at a predetermined concentration, the signal may be used as a reference against which later measurements may be compared. When calibration is complete, the probe may be removed from the container and is ready for analyte detection. Temperature detected by the thermocouple 66 may be used as part of the calibration, measurement, or both.

Depending on the particulars of the probe and sensor construction, one-point, two-point, or multiple-point calibration methods may be carried out. For example, in the field of blood gas monitors, fluorescent optical sensors are used in the measurement of blood pH, $pCO_2$, and $pO_2$, and can calculate $HCO_3$ (standard bicarbonate), BE (base excess), and $SaO_2$ (percent oxygen saturation). Such sensors may be constructed as a single-use disposable unit that can measure a plurality of blood gas samples, e.g., on the order of hundreds, over relatively long periods of time, e.g., 72 hours. In addition, one or more temperature sensor, as well as one or more fiber optic sensors may be used. For example, when three fiber optic sensors each containing a fluorescent indicator dye selected for pH, $pCO_2$, and $pO_2$ detection, the indicator dyes absorb excitation energy which is generated by a monitor and delivered to the dyes by the optic fibers. The dyes in turn emit energy at longer wavelengths which return in the same fibers to the instrument for measurement. Each sensor emits two signals with different analyte sensitivities. The two signals are employed in a ratiometric measurement approach to compensate for common mode disturbances. The single-use, disposable sensor can measure blood samples over 72 hours after a single two-point calibration.

Calibration, for example, may involve the use of a calibrated sensor responsive to a characteristic of an analyte in the physiologic fluid. The calibrated sensor is exposed to a reference sample, thereby producing a sensor response. From the sensor response, at a composition value is calculated for the analyte in the reference sample. The calculated composition value for the analyte is compared with the known concentration of the analyte in the reference sample. Optionally, this is repeated with additional sensors and/or reference samples. A more detailed discussion of calibration techniques is provided in U.S. Pat. No. 5,672,515 to Furlong and U.S. Pat. No. 5,697,366 to Kimball et al.

Generally, it is preferred that the container of the inventive cartridge be sufficiently rigid such that the volume of the cartridge does not substantially change due a difference in pressure between the inside and outside of the cartridge. However, in some instances, flexible containers may be employed as an alternative. Such flexible containers may represent a lower cost alternative to rigid containers and provide ease in packaging. As with the rigid container described above, the flexible container must also be substantially analyte-impermeable. Such flexible packaging technology is generally described in U.S. Pat. No. 5,690,215 to Kimball et al. This patent discloses a device that includes a sealed, gas-impermeable first pouch for maintaining a volume of gas dissolved in a fluid at a predetermined partial pressure. Such a flexible pouch may serve as an analyte-impermeable container for the inventive cartridge. As the pouches disclosed in this patent may be constructed of a laminate of layers, at least one of which is gas impermeable; a weld, adhesive, clamp, clip, or any other type of seal to close the pouch may represent the substantially analyte-impermeable sealing member of the inventive cartridge.

In addition, this patent discloses that "double bagging" is a viable approach for maintaining a volume of gas dissolved in a fluid at a predetermined partial pressure. Thus, where the analyte is in gaseous form, the inventive cartridge may be encased in a sealed, gas-impermeable pouch. A space between the cartridge and the pouch may be charged with an atmosphere containing the gaseous analyte, wherein the volume of the analyte in the atmosphere is greater than the volume of analyte in the cartridge. Preferably, the partial pressure of the analyte in the atmosphere is substantially the same as the partial pressure of the analyte in the cartridge. Double bagging may also be useful in ensuring the integrity and the sterility of the cartridge.

Another embodiment of the invention is a method for manufacturing a cartridge having a probe inserted therein in contact with a calibrant. The method involves providing an analyte-impermeable container having an opening, and then sealing the opening. Before the opening is sealed, each of the following steps is carried out: the container is divided by a septum having a predetermined analyte permeability into a calibrant compartment and an outer compartment, such that the calibrant compartment contains a liquid calibrant and the outer compartment communicates with the opening; a probe is positioned within the container such that the probe extends sealingly through the septum, the probe having an analyte-detecting portion and a connecting portion, wherein the analyte-detection portion is located in the calibrant compartment and the connecting portion is located in the outer compartment; and the calibrant compartment, analyte compartment, or both are filed with an analyte to a predetermined degree. The order of these steps may be varied as long as the inventive cartridge as described above is formed, and in some instances, two or more steps may be carried out simultaneously.

An example of the inventive method is now described, with reference to FIG. 5, in which the cartridge may be manufactured wherein the calibrant is an aqueous solution that contains $CO_2$ as an analyte. A liquid calibrant 12 is prepared having appropriate composition for calibrating a $CO_2$ sensor. The composition of the liquid calibrant 12 is matched to the $CO_2$ mole fraction of a desired gas mixture. This is accomplished, for example, through adjustment of the pH of calibrant by adding the proper ratio of monobasic and dibasic phosphates and bicarbonate. These additives tend to provide for calibrant stability. In addition, osmotic, considerations must be taken into account. Because the probe 30 of the cartridge 10 may be placed in contact with a body tissue immediately after its removal from contact with the calibrant 12, i.e., still wetted by the calibrant, the ideal calibrant should have substantially the same osmolality and/or pH as the tissue that is contacted by the probe. This is particularly important when the probe/sensor is to be placed in contact with the tissue of a subject for an extended period of time. It has been found that osmolality in the mouth is about 25% of normal and that osmolality of nonepidermal tissue elsewhere is about 100% of normal. Also, the calibrant should be sterile and may contain a preservative to maintain solution sterility and to extend shelf life. In other words, it is preferred that all materials used in forming the cartridge 10 are biocompatible.

Figure 5A:
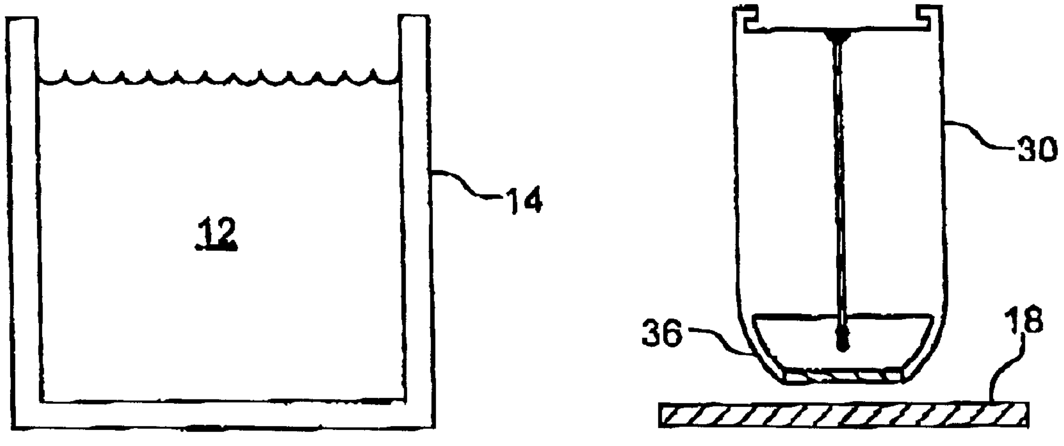
FIGS. 5A–5D, collectively referred to as FIG. 5, illustrate a method for forming the inventive cartridge.
Figure 5B:
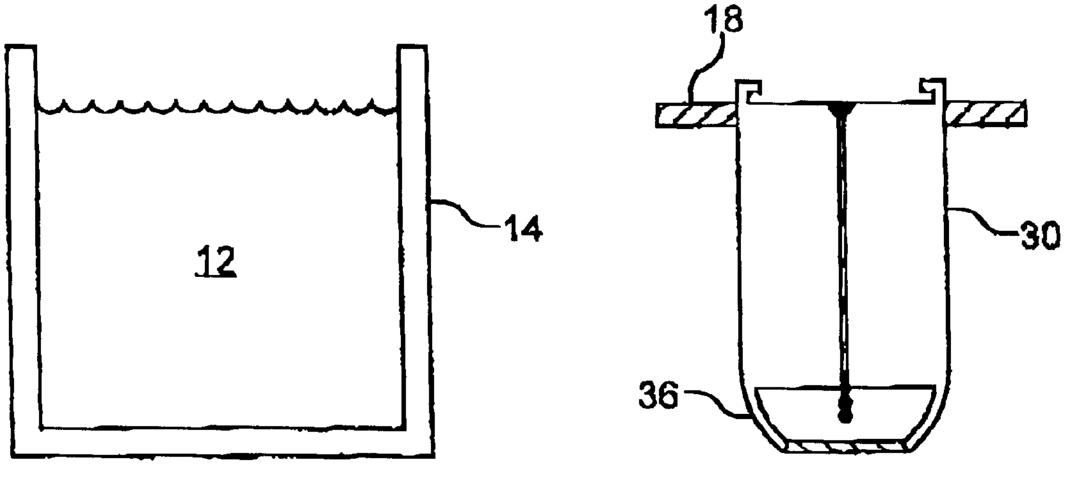
Figure 5C:
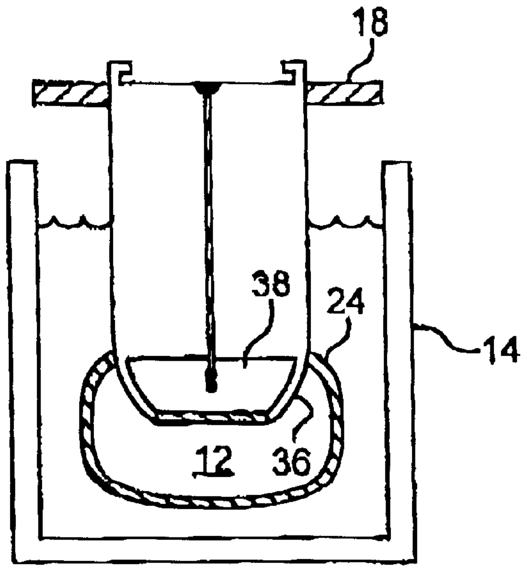
Figure 5D:
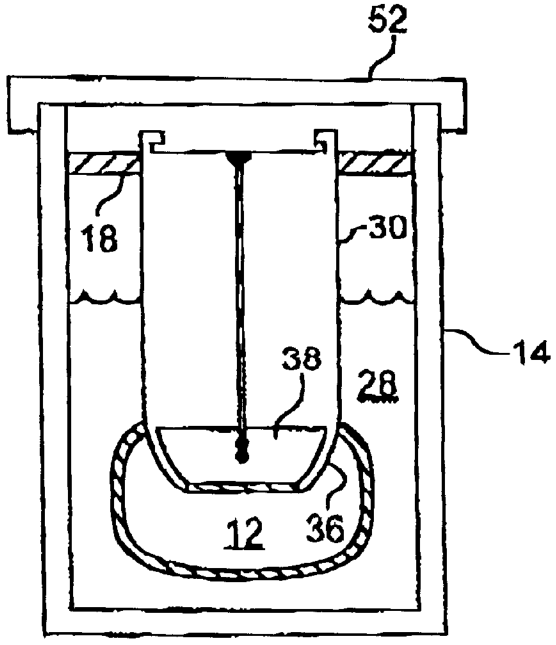

As illustrated in FIG. 5A, a probe 30 of FIG. 1 and a septum are provided. As shown in FIG. 5B, the tip 36 of the probe 30 punctures the septum 18. As the septum 18 conforms to the outer surface of the probe 30, the probe 30 is sealingly extended through a septum 18. Optionally, the septum may be self-sealing upon removal of the probe for multiple insertions. As shown in FIG. 5C, a small amount of calibrant 12, e.g., about 0.1 to about 1 ml, is restrained around the sensing portion 38 of the probe to form the calibrant cell 28 as shown. That is, an analyte-permeable and liquid-impermeable membrane 24 contains the calibrant. FIG. 5C also illustrates that a rigid cylindrical container 14 having a volume of about 20 to about 50 ml is provided, and the probe 30 along with the septum 18 is inserted into the container 14. The container 14 is filled with a mixture of $CO_2$ and $N_2$. This is typically done in a controlled atmosphere, e.g., in a hood or a glove box. In some instances, a needle is extended through the septum to carry out a purging and filling of the calibrant compartment. In such a case, the septum should be puncturable. In addition, the needle may be retracted to purge and fill the outer compartment. In such an instance, the septum should be self-sealable. As depicted in FIG. 5D, the container 14 is sealed with the sealing member 52 such that the cartridge of FIG. 1 is formed.

It is evident that when the probe is inserted into the container, the container is simultaneously divided into a calibrant compartment and an outer compartment with a septum having a predetermined analyte permeability, such that the calibrant compartment contains the liquid calibrant and the outer compartment communicates with the opening; and positioning a probe within the container such that the probe extends sealingly through the septum, the probe having an analyte-permeable portion and a connecting portion, wherein the analyte-permeable portion is located in the calibrant compartment and the connecting portion is located in the outer compartment. When the liquid calibrant contains water, the atmosphere may be humidified to control the vapor pressure in the container to maintain the osmotic equilibrium within the system.

As discussed above, the container may be sealed by any number of means. Once sealed, the interior of the container readily equilibrates with the calibrant fluid through the membrane that forms the calibrant cell. Optionally, heat is applied to the cartridge to provide a "thermal shock" to promote analyte equilibration. Heat may also reduce the bioburden of the cartridge, i.e., the number of contaminating microbes on or in the cartridge prior to sterilization. In particular, any portion of the inventive cartridge that may come into contact with a patient, e.g., the calibrant and the probe, should generally be clean or sterile. The container may be labeled identifying means to track individual containers as well as lots of containers. Identifying means include, for example, barcodes, electronics, magnetic memories, mechanical features, and permanent or rewritable storage media. Employment of such identifying means represent an important feature for quality control purposes.

Variations of the present invention will be apparent to those of ordinary skill in the art. For example, the hardware and software associated with concentration or partial pressure analysis are known in the art and may be adapted for optimal interpretation of signals generated from the sensors. In addition, the cartridge may be used for providing a calibrated probe for quantitating or determining the concentration of blood or other body analytes.

It is to be understood that, while the invention has been described in conjunction with the preferred specific embodiments thereof, the foregoing description and associated figures are intended to illustrate and not limit the scope of the invention. Other aspects, advantages, and modifications within the scope of the invention will be apparent to those skilled in the art to which the invention pertains.

All patents, patent documents, and other references cited herein are hereby incorporated by reference in their entireties.

We claim:

1. A cartridge for packaging a fluid calibrant containing an analyte, comprising:

an analyte-impermeable container having an opening;

a substantially analyte-impermeable sealing member sealing the opening;

a probe comprising an analyte detecting portion and a connecting portion;

a septum that divides the container into a calibrant compartment that contains the fluid calibrant having a predetermined analyte concentration and an outer compartment that communicates with the opening; and wherein the probe extends sealingly through the septum such that the analyte-detecting portion of the probe is located in the calibrant compartment and the connecting portion is located in the outer compartment.

2. The cartridge of claim 1, wherein the connecting portion of the probe allows the probe to be operatively connected to a device for quantitating or determining the concentration of the analyte.

3. The cartridge of claim 1, further comprising an analyte-permeable and liquid-impermeable membrane that divides the calibrant compartment into a calibrant cell and analyte cell, wherein the calibrant is a liquid, the calibrant cell contains the calibrant and the analyte cell contains analyte.

4. The cartridge of claim 1, wherein the analyte is a gas.

5. The cartridge of claim 4, wherein the gas is selected from $CO_2$, CO, $O_2$ and NO.

6. The cartridge of claim 1, wherein the fluid calibrant contains a liquid.

7. The cartridge of claim 6, wherein the liquid is water.

8. The cartridge of claim 6, wherein the fluid calibrant contains an additive selected from an acid, base, salt and gas.

9. The cartridge of claim 8, wherein the additive is a buffering compound.

10. The cartridge of claim 9, wherein the buffering compound is selected from a phosphate, carbonate, and bicarbonate.

11. The cartridge of claim 6, wherein the liquid calibrant contains an organic compound.

12. The cartridge of claim 1, wherein the septum has a predetermined permeability selected to prevent analyte concentration in the calibrant from deviating outside a desired range for a time period of at least about 1 minute after continuous exposure of the outer compartment to atmospheric conditions.

13. The cartridge of claim 12, wherein the time period is at least about 5 minutes.

14. The cartridge of claim 1, wherein the septum is puncturable.

15. The cartridge of claim 1, wherein the septum is self-sealable.

16. The cartridge of claim 1, wherein the septum is composed of an elastic material.

17. The cartridge of claim 16, wherein the elastic material is selected from the group consisting of silicones, urethanes, fluorinated polymers, nitrile rubbers, alkylene rubbers, diene rubbers, mixtures thereof, and copolymers of any of the foregoing.

18. The cartridge of claim 1, wherein the container is sufficiently rigid such that the analyte concentration within the calibrant compartment does not substantially change due a difference in pressure between the inside and outside of the cartridge.

19. The cartridge of claim 18, wherein the difference is no more than about 760 torr.

20. The cartridge of claim 19, wherein the difference is no more than about 76 torr.

21. The cartridge of claim 1, wherein the container is flexible.

22. The cartridge of claim 1 wherein the sealing member is selected from the group consisting of a cap, lid, foil, laminate, cover, plug, insert, bag, septum, weld and can.

23. The cartridge of claim 1, wherein the outer compartment contains the analyte at equilibrium with the analyte in the calibrant compartment.

24. The cartridge of claim 1, wherein the device is adapted for blood or tissue analysis.

25. The cartridge of claim 1, wherein the septum renders the probe substantially immobile with respect to the container.

26. The cartridge of claim 1, further comprising a sensor responsive to an analyte, wherein the sensor is contained in the probe, communicates with the calibrant compartment through the analyte-detecting portion of the probe and is operatively connected to the connecting portion of the probe.

27. The cartridge of claim 26, further comprising at least one additional sensor responsive to one or more different analytes.

28. A cartridge for packaging a fluid calibrant containing an analyte, comprising:

- an analyte-impermeable container defining a volume and having an opening;
- a fluid calibrant containing an analyte within the container;
- a probe comprising an analyte-detecting portion, a sealing portion, and a connecting portion; and
- wherein the analyte-detecting portion of the probe is located within the container, the sealing portion is adapted to seal the container opening, and the connecting portion allows the probe to be operatively connected to a device external to the cartridge for quantitating or determining the concentration of the analyte while the opening is sealed by the sealing portion of the probe.

29. The cartridge of claim 28, further comprising an analyte-permeable membrane that divides the volume into a calibrant compartment containing the fluid calibrant and an outer compartment that communicates with the opening, wherein the probe extends through the analyte permeable membrane and the analyte detecting portion of the probe is located in the calibrant compartment.

30. The cartridge of claim 28, wherein the analyte is a gas.

31. The cartridge of claim 29, wherein the probe contains a sensor in communication with the calibrant compartment through the analyte-detecting portion of the probe, and the sensor is operatively connected to the connecting portion of the probe.

32. A cartridge for packaging a fluid calibrant containing an analyte, comprising:

- an analyte-impermeable container having an opening;
- a substantially analyte-impermeable sealing member adapted to seal the opening;
- a membrane that divides the container into a calibrant compartment containing the fluid calibrant and an outer compartment that communicates with the opening; and
- wherein the cartridge is adapted to allow a probe having an analyte-detecting portion to extend through the opening of the container and to sealingly pierce through the membrane such that the analyte-detecting portion of the probe is placed in the calibrant compartment.

33. A method for preparing a cartridge containing a calibrant and a probe comprising the steps of:

- (a) providing an analyte-impermeable container having an opening;
- (b) dividing the container into a calibrant compartment and an outer compartment by a septum having a predetermined analyte permeability, such that the calibrant compartment contains a fluid calibrant and the outer compartment communicates with the opening;
- (c) positioning a probe within the container such that the probe extends sealingly through the septum, wherein the probe has an analyte-detecting portion and a connecting portion, the analyte-detection portion is located in the calibrant compartment, and the connecting portion is located in the outer compartment;
- (d) filling the container with a sufficient amount of analyte so as to allow the fluid calibrant to stabilize at a predetermined analyte concentration; and
- (e) rendering the opening substantially analyte-impermeable.

34. The method of claim 33, further comprising, after step (a) and before step (e), dividing the calibrant compartment with an analyte-permeable and liquid-impermeable membrane into a calibrant cell and analyte cell, wherein the calibrant cell contains the liquid calibrant and the analyte cell contains the analyte.

35. The method of claim 33, wherein step (d) is carried out through an incremental filling of the container.

36. The method of claim 33, wherein the analyte is a gas.

37. The method of claim 36, wherein the gas is selected from $CO_2$, CO, $O_2$, and NO.

38. The method of claim 33, wherein the fluid calibrant contains a liquid.

39. The method of claim 38, wherein the liquid is water.

40. The method of claim 38, wherein the fluid calibrant contains an additive selected from an acid, base, salt and a gas.

41. The method of claim 40, wherein the additive is a buffering compound.

42. The method of claim 41, wherein the buffering compound is selected from a phosphate, carbonate, and bicarbonate.

43. The method of claim 40, wherein the liquid calibrant contains an organic compound.

44. The method of claim 33, wherein the predetermined permeability prevents analyte concentration in the calibrant from deviating outside a desired range for at least about 1 minute after continuous exposure of the outer compartment to atmospheric conditions.

45. The method of claim 44, wherein the predetermined permeability prevents the analyte concentration in the calibrant from deviating outside a desired range for at least about 5 minutes after continuous exposure of the outer compartment to atmospheric conditions.

46. The method of claim 33, wherein the septum is puncturable.

47. The method of claim 33, wherein the septum is self-sealable.

48. The method of claim 33, wherein the septum is composed of an elastic material.

49. The method of claim 48, wherein the elastic material is selected from the group consisting of silicones, urethanes, fluorinated polymers, nitrile rubbers, alkylene rubbers, diene rubbers, mixtures thereof, and copolymers of any of the foregoing.

50. The method of claim 33, wherein the container is sufficiently rigid such that the volume of the cartridge does not substantially change due a difference in pressure between the inside and outside of the cartridge.

51. The method of claim 50, wherein the difference is no more than about 760 torr.

52. The method of claim 51, wherein the difference is no more than about 76 torr.

53. The method of claim 33, wherein the container is flexible.

54. The method of claim 33, wherein the sealing member is selected from the group consisting of a cap, lid, foil, laminate, cover, plug, insert, bag, septum, weld and can.

55. The method of claim 33, wherein the outer compartment contains the analyte at equilibrium with the analyte in the calibrant compartment.

56. The method of claim 33, wherein the calibrant has an osmolality that is compatible for contact with a tissue within a patient.

57. The method of claim 33, wherein the septum renders the probe substantially immobile with respect to the container.

58. The method of claim 33, wherein the probe contains a sensor that communicates with the calibrant compartment through the analyte-detecting portion of the probe and is operatively connected to the connecting portion of the probe.

59. The method of claim 58, further the probe contains an additional sensor responsive to a different analyte.

60. A method for calibrating a device for quantitating or determining the concentration of an analyte for use with the cartridge of claim 1, comprising:

(a) providing the cartridge of claim 1;

(b) removing the sealing member;

(c) connecting the analyte-detecting portion of the probe to a device in need of calibration for quantitating or determining the concentration of the analyte; and (d) calibrating the device from the predetermined analyte concentration in the fluid calibrant before the analyte concentration deviates from a desired concentration range.

61. The method of claim 60, wherein cartridge provided in step (a) further comprise a sensor responsive to an analyte, wherein the sensor is contained in the probe, communicates with the calibrant compartment through the analyte-detecting portion of the probe and is operatively connected to the connecting portion of the probe and step (c) results in the operative connection between the sensor and the device.

62. The method of claim 60, further comprising, after step (b) and before step (c), (b') inserting a sensor in operative connection with the device into the probe such that the sensor communicates with the calibrant compartment through the analyte-detecting portion of the probe.

63. A method for calibrating a device for quantitating or determining the concentration of an analyte for use with the cartridge of claim 28, comprising:

(a) providing the cartridge of claim 28;

(b) connecting the analyte-detecting portion of the probe to a device in need of calibration for quantitating or determining the concentration of the analyte; and (c) calibrating the device from the predetermined analyte concentration in the fluid calibrant.

64. A method for calibrating a device for quantitating or determining the concentration of an analyte for use with the cartridge of claim 26, comprising:

(a) providing the cartridge of claim 26;

(b) removing the sealing member;

(c) inserting a probe having an analyte-detecting portion to extend through the opening of the container and to sealingly pierce through the membrane such that the analyte-detecting portion of the probe is placed in the calibrant compartment, wherein the probe is operatively connected to a device in need of calibration for quantitating or determining the concentration of the analyte; and (d) calibrating the device from the predetermined analyte concentration in the fluid calibrant before the analyte concentration deviates from a desired concentration range.

* * * * *